United States Patent [19]

Grinacoff

[11] Patent Number: 4,474,915
[45] Date of Patent: Oct. 2, 1984

[54] MODIFIED VINYL ACETATE ADHESIVE COMPOSITIONS CONTAINING LOW TEMPERATURE FUSION AIDS

[75] Inventor: Ernest J. Grinacoff, Belle Mead, N.J.

[73] Assignee: National Starch and Chemical Corporation, Bridgewater, N.J.

[21] Appl. No.: 499,104

[22] Filed: May 27, 1983

Related U.S. Application Data

[63] Continuation-in-part of Ser. No. 422,109, Sep. 22, 1982, abandoned.

[51] Int. Cl.$^3$ ............................ C08J 5/15; C08J 5/10; C09J 3/14; B32B 27/24
[52] U.S. Cl. .............................. 524/111; 428/355; 428/514; 428/522; 524/306; 524/317; 524/459; 524/503; 524/555
[58] Field of Search .............. 524/306, 317, 111, 555, 524/459, 503

[56] References Cited

U.S. PATENT DOCUMENTS

| | | | |
|---|---|---|---|
| 2,595,956 | 5/1952 | Kunze | 524/317 |
| 3,041,301 | 6/1962 | Armour | 524/510 |
| 3,301,809 | 1/1967 | Goldberg | 524/459 |
| 3,563,851 | 2/1971 | Armour | 524/503 |
| 3,580,876 | 5/1971 | Stone | 524/317 |
| 3,730,933 | 5/1973 | Stehle | 524/459 |
| 3,746,679 | 7/1973 | Seipel | 524/317 |
| 4,085,074 | 4/1978 | Woo | 524/555 |

*Primary Examiner*—G. Warren Ivy
*Attorney, Agent, or Firm*—Edwin M. Szala; Margaret B. Kelley

[57] ABSTRACT

Modified vinyl acetate aqueous adhesive compositions containing acidic metal salt curing agents, which are suitable for exterior applications where water resistance is required, contain selected solvents as low temperature fusion aids. The adhesives are characterized by their film forming properties at temperatures as low as $-1°$ C., increased closed assembly times of at least up to 40 minutes, improved storage stability, and their satisfactory cold and hot water resistance. They consist essentially of a mixture of (a) an aqueous emulsion of a stabilized vinyl acetate/N-methylol acrylamide polymer; (b) a metal salt curing agent; (c) optionally a crosslinking inhibitor; and (d) 1–7%, based on the polymer solids, of ethylene glycol monomethyl ether acetate, ethylene glycol diacetate, or tetrahydrofurfuryl alcohol as the fusion aid.

13 Claims, No Drawings

MODIFIED VINYL ACETATE ADHESIVE COMPOSITIONS CONTAINING LOW TEMPERATURE FUSION AIDS

This application is a continuation-in-part of Ser. No. 422,109, filed Sept. 22, 1982, now abandoned.

BACKGROUND OF THE INVENTION

This invention relates to aqueous stabilized vinyl acetate emulsion adhesives containing acidic metal salt curing agents which are modified by the addition of selected solvents as low temperature fusion aids.

Aqueous polyvinyl acetate adhesives have a number of excellent properties such as good adhesion, rapid hardening, colorless adhesive joints, and good workability. Due to the presence of hydrophilic protective colloids which are added to stabilize the emulsions against gelling during storage, the adhesive joints are not very waterproof.

The water sensitivity caused by the presence of the protective colloids, specifically polyvinyl alcohol, can be reduced by adding acidic metal salt curing agents, as disclosed in U.S. Pat. No. 3,563,851 issued Feb. 16, 1971 to W. B. Armour et al. These salts crosslink the adhesive coating or films and thus enhance their water resistance. The acidic nature of the curing agents also serves to accelerate the curing procedure. The resulting adhesives are particularly useful for exterior applications since they retain their excellent adhesive properties and physical structure even after prolonged exposure to moisture.

The basic disadvantage of the salt-containing systems was the inability of the adhesives to film form at temperatures below 13° C. (55° F.) and the tendency to precure very readily (their closed assembly times were less than 10 minutes). Most manufacturing specifications require film forming at temperatures as low as −1° C. (30° F.) and closed assembly times of up to 30 minutes. Adding 2,4,6-tris(hydroxymethyl)phenol, commonly known as trimethylol phenol (TMP), to such systems solved this problem. The low temperature fusion was reduced and the closed assembly time was increased to the required levels. The improved performance provided by TMP was believed to be due to the high trifunctionality of the additive and the increased density of the crosslinks formed with the vinyl acetate copolymers. Improvements in the thermosetting and elastomeric properties of polyvinyl acetate adhesives containing TMP are reported in U.S. Pat. No. 3,041,301 issued June 26, 1962 to W. B. Armour.

Several years ago the manufacture of TMP was discontinued and numerous chemicals were evaluated, without considerable success, for use as low temperature fusion aids. Of these, water soluble phenolics containing low levels of trifunctionality were the best. The phenolics would generally crosslink if the levels of functional groups in the vinyl acetate copolymer were adequate. However, if crosslinking did not occur, their presence had an undesirable plasticizing effect which reduced the water resistance of the adhesive bonds, particularly the boiling water resistance. This problem could only be overcome by making the system more unstable and then the storage stability of the system was poor. The performance of the adhesive was also inconsistent. A further disadvantage was the presence of free formaldehyde in the phenolics.

Hence, the search began for an improved low temperature fusion aid for stabilized vinyl acetate adhesive systems containing acidic metal salt curing agents.

SUMMARY OF THE INVENTION

The present invention provides modified, stabilized vinyl acetate adhesive compositions containing acidic metal salt curing agents, suitable for exterior applications, which are characterized by their film-forming properties at temperatures as low as −1° C. (30° F.), increased closed assembly times of up to 40 minutes, improved storage stability, and their satisfactory cold and hot water resistance.

The water resistant vinyl acetate aqueous adhesives suitable for exterior appliances consist essentially of a mixture of:

(a) an aqueous emulsion of a stabilized vinyl acetate polymer of 80-99% vinyl acetate, 1-16% N-alkylol acrylamide or methacrylamide, and 0-19% of an ethylenically unsaturated monomer selected from the group consisting of acrylic acid, methacrylic acid, the alkyl esters of acrylic or methacrylic acid, $\alpha,\beta$-unsaturated dicarboxylic acids, mono- or dialkyl esters of $\alpha,\beta$-unsaturated dicarboxylic acids, vinyl halides, vinylidene halides, and amides of $\alpha,\beta$-unsaturated carboxylic acids, the percentages being by weight and totaling 100%;

(b) a metal salt curing agent selected from the group consisting of chromic nitrate, chromic perchlorate, chromic chloride, aluminum nitrate, and aluminum chloride, which is present in a concentration of from about 0.003 to 0.12 gram equivalents per each 100 grams of the total weight of the adhesive composition;

(c) a cross-linking inhibitor selected from the group consisting of ammonia, alkyl amines, and alkylol amines, wherein the mole ratio of the cross-linking inhibitor to the curing agent ranges from 0-1.7; and (d) a low temperature fusion aid selected from the group consisting of ethylene glycol monomethyl ether acetate, ethylene glycol diacetate, and tetrahydrofurfuryl alcohol, which is present in a concentration of from about 1 to 7% by weight of the polymer solids.

Cold press, hot press, and RF (radio frequency) bonding methods may be used.

DESCRIPTION OF THE PREFERRED EMBODIMENTS

Stabilized aqueous vinyl acetate/N-methylol acrylamide copolymer emulsions useful herein for water-resistant adhesives containing acidic metal salt curing agents are described in U.S. Pat. No. 3,301,809 issued Jan. 31, 1967 to A. I. Goldberg et al. The polymers suitable for use herein are prepared by known aqueous emulsion polymerization techniques using a stabilizer such as polyvinyl alcohol as the main emulsifier or protective colloid. The presence of the polyvinyl alcohol, which is used in an amount from about 2–10% by weight based on the total monomer charge, permits the preparation of stable (nongelling) aqueous emulsions and the films derived therefrom are clear and free from grits. The polyvinyl alcohol used is from about 80–90% hydrolyzed and has a Hoeppler viscosity in the range of about 5–25 centipoises (cps.), as determined with a 4%, by weight, aqueous solution at a temperature of 20° C.

The polymerization is typically carried out, under agitation, at reflux temperatures in the range of about 60°–80° C. for about 3–6 hours in the presence of the polyvinyl alcohol and about 0.1–2% by weight, based on the total monomer charge, of a free radical catalyst such as organic and inorganic peroxides or inorganic persulfate salts. Preferably, an aqueous solution of the monomeric N-alkylol acrylamide is slowly added to the emulsified vinyl acetate monomer. The copolymers typically contain from about 84-99% by weight vinyl acetate and 1-16% by weight of a N-alkylol acrylamide or methacrylamide, preferably N-methylol acrylamide. The terpolymers typically contain from about 80-98% by weight of vinyl acetate, 1-16% by weight of N-alkylol acrylamide or methacrylamide, preferably N-methylol acrylamide, and 1-19% by weight of one of the ethylenically unsaturated monomers described above, the percentages totaling 100%. Polymers containing a mixture of the optional unsaturated monomers may also be prepared. Preferably the polymers contain about 1-15% by weight N-methylol acrylamide. The aqueous emulsions have a solids content of about 40-60% by weight, and the above copolymer emulsions have an initial viscosity of about 500-10,000 cps., as determined at 25° C. with a Brookfield viscometer using an LVF #3 spindle at 60 r.p.m. After the polymerization reaction is substantially completed, the product is cooled and its pH adjusted to a level of from about 4 to about 6 by the addition of a volatile base such as ammonia which aids in reducing viscosity changes with time. Emulsions treated in this manner have been found to have a minimum useful life time of up to six months or more. Other suitable volatile bases include morpholine, dimethyl amino ethanol and triethyl amine.

Aqueous vinyl acetate/N-alkylol acrylamide polymer emulsions stabilized with selected compounds other than polyvinyl alcohol (e.g. cellulosic stabilized vinyl acetate/N-methylol acrylamide aqueous emulsions such as those marketed by Air Products and Chemicals, Inc. under the trade name Vinac AX10) are also suitable for use herein. Typical cellulosic stabilizers include hydroxyethyl and carboxymethyl cellulose.

The acidic metal salt curing agent is selected from the group consisting of chromic nitrate, chromic perchlorate, chromic chloride, aluminum nitrate, and aluminum chloride. The salt is present in a concentration of from about 0.003 to 0.12 gram equivalents per each 100 grams of the total weight of the adhesive composition. The preferred metal salt is aluminum chloride used in an amount of about 0.08 to 0.12 gram equivalents. The curing agents may be added to the adhesive at the time the formulations are to be utilized or added earlier in conjunction with the cross-linking inhibitor.

The proportion of metal salt added depends on the desired degree of cure. However, it has been found impractical to add more than about 0.12 gram equivalents of curing agent (anhydrous basis) per each 100 grams of the total emulsion weight, i.e. total solids plus water, since the adhesive formulations containing such excessive concentrations of curing agent are ordinarily quite corrosive. The lower practical limit for the concentration of curing agent solids is about 0.003 gram equivalents since formulations containing less than this amount usually display poor water resistance.

The optional cross-linking inhibitors useful herein are described in U.S. Pat. No. 4,085,074 issued Apr. 18, 1978 to M. C. Woo and re-issued as U.S. Pat. Re. No. 30,576. Typical inhibitors include ammonia, alkyl amines (e.g. triethyl amine), and alkylol amines (e.g. triethanol amine and N-methylethanol amine). When used, they are added ordinarily in amounts such that the mole ratio of the inhibitor to curing agent ranges from 0.1 to 1.7. They may be added to the vessel at the end of the polymerization reaction or they may be post added prior to or with the curing agent. Their addition improves the storage stability of the adhesives.

The fusion aids which may be utilized in the adhesives herein are selected from the group consisting of ethylene glycol monomethyl ether acetate (commonly sold under the name Methyl Cellosolve Acetate by Union Carbide), ethylene glycol diacetate, and tetrahydrofurfuryl alcohol (commonly sold under the tradename THFA by Quaker Oats Co.) They are present in amounts of from about 1-7%, preferably 2-5% for ethylene glycol monomethyl ether acetate and ethylene glycol diacetate and 5-7% for tetrahydrofurfuryl alcohol, based on the weight of the copolymer solids. The solvent is added to the adhesive formulation either prior to, with, or after the addition of the curing agent. Their use reduces the low temperature fusion to $-1°$ C. and increases the closed assembly time to at least 40 minutes without adversely affecting the cold or hot water resistance or the strength of the adhesive bonds resulting from the application of the adhesives.

The adhesives herein may be used in bonding, saturation or lamination of many types of solid substrates, especially wood for exterior applications. When adhering substrates which have been coated with the above adhesives, wet combining methods are used. The freshly coated substrates may be adhered at room temperature under pressures of from about 30 to 300 psi (0.21-2.07 $nm^2$) which are applied for periods of from about 0.5-3 hours. By increasing the temperature, both the pressure and press time will, of course, be reduced proportionately.

The following examples will more fully illustrate the embodiments of the invention. In the examples, all parts and percentages are given by weight and all temperatures are in degrees Celsium unless otherwise noted. The wet and dry testing procedures used to evaluate the water resistance of the adhesives were carried out on three-ply birch laminates prepared by applying the adhesive in a 7 mil wet film to one surface of a number of $\frac{1}{8}$ in. (0.32 cm.) thick birch veneers, cold compressing three of these veneers for 1 hr. under a pressure of 200 psi (1.38 $nm^2$) and at a temperature of 22° C. The laminates were then cut into 1 in. by 1 in. (2.54 cm. by 2.54 cm.) test specimens which were $\frac{3}{8}$ in. thick (0.95 cm.). The specimens were evaluated for their water resistance using the testing procedures for Type I hardwood plywood as established by the U.S. Department of Commerce, Commercial Standard PS-51-71.

The tensile shear strength, in psi ($nm^2$), necessary to delaminate the samples was determined using an Instron Tensile Tester at a rate of shear of 0.5 in./min. (1.27 cm./min.). Following the tensile shear strength determinations, the test specimens were examined to determine the percent wood failure. The percent wood failure indicates what percentage of the total area of the wood surface, at the interface with the adhesive film, was torn while being subjected to the tensile shear determination. Thus, a high percentage of wood failure indicates a strong adhesive bond since the wood rather than the adhesive bond has been torn.

EXAMPLE I

This example shows the use of various solvents as fusion aids in vinyl acetate/N-methylol acrylamide adhesive compositions in the presence and absence of an acidic metal salt curing agent.

The copolymer was prepared in a conventional manner by the aqueous emulsion polymerization of 98.5 parts vinyl acetate and 1.5 parts N-methylol acrylamide in the presence of 1.6% of a mixture of a medium and high viscosity polyvinyl alcohol, based on the total aqueous composition. The copolymer was mixed with the curing agent (aluminum chloride), and the minimum amount of solvent required to reduce the low temperature fusion to $-4°$ C. ($25°$ F.) was determined. The solvents used and the amounts required are shown below. Comparative data on the prior art phenolic fusion aid is included.

| Fusion Aid | Amount Required (%) to $-4°$ C. | |
|---|---|---|
| | With Aluminum Chloride (5 wt. %) | Without Aluminum Chloride |
| Ethylene Glycol Monobutyl Ether Acetate (Butyl Cellosolve Acetate) | 3.0 | 2.0 |
| Ethylene Glycol Monomethyl Ether Acetate (Methyl Cellosolve Acetate) | 3.5 | 2.0 |
| Ethylene Glycol Diacetate | 3.5 | 1.5 |
| n-Hexyl Carbitol | 4.0 | 2.0 |
| Furfuryl Alcohol | 4.0 | 2.0 |
| Texanol (2,4-trimethylpentanediol 1,3-monoisobutyrate) | 4.0 | 3.5 |
| Tetrahydrofurfuryl Alcohol | 6.5 | 4.0 |
| Propasol DM (propoxy propanol dipropylene glycol monomethyl ether) | 10.0 | 7.0 |
| Phenolic* | 6.5 | 3.0 |

*Comparative

The results show that all of the above solvents were capable of reducing the low temperature fusion to $-4°$ C. provided a sufficient amount was employed, with larger amounts being required when the curing agent was present. All of the samples exceeded the minimum closed assembly time performance (40 min.) as determined by PS-51-71. However, as will be shown in the following example, only three of the solvents provided the required water resistance.

EXAMPLE II

In this example, the water resistance exhibited by some of the modified vinyl acetate/N-methylol acrylamide adhesives of Example I was determined and compared with that of the same adhesive containing the prior art phenolic fusion aid. The adhesives evaluated were those containing the curing agent (5 wt. % AlCl₃) and the more effective fusion aids which were generally used in amounts sufficient to provide the desired low temperature fusion. The test results are given in the following Table. Data on the minimum water resistance requirements for birch is included in the footnote.

| Fusion Aid (% added) | % Required* to $-4°$ C. | Water Resistance Tests - PS 51-71** | | |
|---|---|---|---|---|
| | | Room Temperature (psi/% wood tear) | Pressure Soak Cycle (psi/% wood tear) | Boil Cycle (psi % wood tear) |
| Ethylene Glycol Monomethyl Ether Acetate (4%) (Methyl Cellosolve Acetate) | 3.5% | 653/100 | 352/80 | 311/100 |
| Ethylene Glycol Diacetate (3%) | 3.5% | 641/100 | 395/80 | 334/95 |
| Tetrahydrofurfuryl Alcohol (6.5%) | 6.5% | 620/100 | 385/91 | 315/98 |
| Furfuryl Alcohol (2%) | 4.0% | 601/100 | 373/60 | 265/15 |
| n-Hexyl Carbitol (3%) | 4.0% | 541/51 | 248/28 | 135/0 |
| Ethylene Glycol Monobutyl Ether Acetate (4%) (Butyl Cellosolve Acetate) | 3.0% | 482/75 | 252/40 | 198/10 |
| Texanol (5%) | 4.0% | 510/100 | 349/68 | 210/15 |
| Phenolic***(6.5%) | 6.5% | 584/100 | 273/75 | 291/45 |

*Based on results reported in Example I
**PS-51-71 minimum standards for birch are <250 psi/50% wood tear; 250-350 psi/30% wood tear; and >350 psi/15% wood tear.
***Comparative The results show that only ethylene glycol monomethyl ether acetate, ethylene glycol diacetate, and tetrahydrofurfuryl alcohol performed well and that the other solvents adversely affected the boiling water-resistance of the adhesives. The adhesive containing n-hexyl carbitol was especialy poor in boiling water resistance and marginal in the cold water resistance. The adhesives containing furfuryl alcohol, ethylene glycol monobutyl ether acetate, and Texanol were somewhat better in cold water resistance but likewise poor in boiling water resistance. The adhesives containing ethylene glycol monomethyl ether acetate, ethylene glycol diacetate, and tetrahydrofurfuryl alcohol showed good water resistance in both hot and cold water, as well as very good resistance in the pressure soak cycle, when used in amounts sufficient to provide the desired low temperature fusion (4%, 3%, and 6.5%, respectively). They were superior to the phenolic fusion aid of the prior art. The acetate and diacetate were good even at lower usage levels (4% and 3% vs. 6.5% for the phenolic).

EXAMPLE III

This example demonstrates the use of ethylene glycol monomethyl ether acetate and tetrahydrofurfuryl alcohol in another vinyl acetate/N-methylol acrylamide adhesive containing 5 wt. % aluminum chloride. The copolymer was Vinac AX10, a vinyl acetate copolymer similar to that of Example I but stabilized with cellulosics rather than polyvinyl alcohol. With the addition of 4 wt. % ethylene glycol monomethyl ether acetate the low temperature fusion was $-1°$ C. ($30°$ F.); with the addition of 6.5 wt. % tetrahydrofurfuryl alcohol it was $-4°$ C. ($39°$ F.). The water resistance of birch veneer laminates prepared with the adhesives was good. With the ethylene glycol monomethyl ether acetate the test results were 482 psi/65% wood failure for the Room Temperature test; 278 psi/36% wood failure for the Pressure Soak Cycle test; and 263 psi/38% wood failure for the Boil Cycle test. With the tetrahydrofurfuryl alcohol the results were 575 psi/100%; 315 psi/64%; and 291 psi/51% for the respective tests.

EXAMPLE IV

This example studies the effect on the low temperature fusion of the addition of different amounts of ethylene glycol monomethyl ether acetate (EGMMEA) to various vinyl acetate polymers of differing $T_g$ values.

The polymers tested, the amount of solvent used, and the low temperature fusion (in the absence of an acid metal salt curing agent) are given below.

| Polymer | | Low Temperature Fusion With EGMMEA (%) | | |
|---|---|---|---|---|
| | Tg | °C. (°F.) | | |
| Description | °C. (°F.) | 0% | 2% | 3.5% |
| Homopolymer | −2 (+28) | 16 (60) | 3 (38) | 3 (38) |
| Vinyl acetate/Carboxylate Copolymer[a] | −3 (+27) | 10 (50) | 4 (40) | 3 (38) |
| Vinyl acetate/Carboxylic Acid Copolymer[b] | −1 (+30) | 16 (60) | 4 (40) | 2 (36) |
| Vinyl acetate/Acrylate Terpolymer[c] | −29 (−20) | 0 (32) | 0 (32) | 0 (32) |
| Vinyl acetate/N—Methylol acrylamide Copolymer of Example I | −2 (+29) | 16 (60) | −4 (25) | −4 (25) |

[a]Copolymer of 97% vinyl acetate and 3% maleic acid cyanoethyl half-ester (stabilized with polyvinyl alcohol)
[b]Copolymer of 99% vinyl acetate and 1% acrylic acid (stabilized with polyvinyl alcohol)
[c]Terpoymer of 50% vinyl acetate, 47% butyl acrylate, and 4% N—methylolacrylamide (stabilized with surfactant)

The results show that the addition of ethylene glycol monomethyl ether acetate was effective in reducing the low temperature fusion of the homopolymer and those copolymers having a $T_g$ above 0° C. (32° F.). The addition, however, had no effect on the low temperature fusion of the terpolymer having an initially low $T_g$ (−29° C., −20° F.).

When formulated with 5 wt. % aluminum chloride and 3.5 wt. % ethylene glycol monomethyl ether acetate and evaluated for water resistance, only the vinyl acetate/N-methylol acrylamide copolymer of Example I showed both satisfactory water-resistance and reduced low temperature fusion (to −4° C., −25° F.). The formulation containing the vinyl acetate terpolymer was water-resistant but, as noted above, its low temperature fusion was unchanged, remaining at 0° C. (32° F.) even with increasing amounts of solvent. The other laminates failed; they voluntarily separated during the Pressure Soak Cycle and Boil Cycle tests.

Summarizing this invention provides three selected solvents useful as low temperature fusion aids for water resistant vinyl acetate/N-alkylol acrylamide adhesives.

Now that the preferred embodiments of the present invention have been described in detail, various modifications and improvements thereon will become readily apparent to those skilled in the art. Accordingly, the spirit and scope of the invention are to be limited only by the appended claims and not by the foregoing specification.

What is claimed is:

1. A water-resistant vinyl acetate aqueous adhesive composition, characterized by its reduced low temperature fusion, which consists essentially of a mixture of:
   (a) an aqueous emulsion of a emulsion-stabilized vinyl acetate polymer of 80-99% vinyl acetate, 1-16% N-alkylol acrylamide or methacrylamide, and 0-19% of an ethylenically unsaturated monomer selected from the group consisting of acrylic acid, methacrylic acid, the alkyl esters of acrylic or methacrylic acid, α,β-unsaturated dicarboxylic acids, mono- or dialkyl esters of α,β-unsaturated dicarboxylic acids, vinyl halides, and vinylidene halides, and amides of α,β-unsaturated carboxylic acids, the percentages being by weight and totaling 100%;
   (b) a metal salt curing agent selected from the group consisting of chromic nitrate, chromic perchlorate, chromic chloride, aluminum nitrate, and aluminum chloride, which is present in a concentration of from about 0.003 to 0.12 gram equivalents per each 100 grams of the total weight of the adhesive composition; and
   (c) a cross-linking inhibitor selected from the group consisting of ammonia, alkyl amines, and alkylol amines, wherein the mole ratio of the cross-linking inhibitor to the curing agent ranges from 0–1.7; and
   (d) a low temperature fusion aid selected from the group consisting of ethylene glycol monomethyl ether acetate, ethylene glycol diacetate, and tetrahydrofurfuryl alcohol which is present in a concentration of from about 1 to 7% by weight of the polymer solids.

2. The adhesive composition of claim 1, wherein the vinyl acetate polymer is a copolymer containing about 1-5% by weight of N-methylol acrylamide prepared by emulsion polymerization in the presence of a hydrophilic protective colloid as the stabilizer; wherein the curing agent is aluminum chloride; and wherein the fusion aid is present in a concentration of from about 2 to 6.5%.

3. The adhesive composition of claim 2, wherein the crosslinking inhibitor is ammonia, triethyl amine, triethanol amine, or N-methylethanol amine in a mole ratio of 0.1-0.7.

4. The adhesive composition of claim 3, wherein the vinyl acetate copolymer contains about 1-2% by weight of N-methylol acrylamide and is prepared by emulsion polymerization in the presence of 2-12% of polyvinyl alcohol based on the weight of the copolymer solids, the polyvinyl alcohol being from about 80-90% hydrolyzed and having a Hoeppler viscosity in the range of about 5-25 centipoises, as determined with a 4% by weight aqueous solution at 20° C.

5. The adhesive composition of claim 2, characterized by the low temperature fusion of −1° C. or less and a closed assembly time of at least about 40 minutes.

6. The adhesive composition of claim 3, characterized by the low temperature fusion of −1° C. or less and closed assembly time of at least about 40 minutes.

7. The adhesive composition of claim 4, characterized by the low temperature fusion of −4° C. or less and a closed assembly time of at least about 40 minutes.

8. The adhesive composition of claim 5, wherein the low temperature fusion aid is ethylene glycol monomethyl ether acetate or ethylene glycol diacetate.

9. The adhesive composition of claim 6, wherein the low temperature fusion aid is ethylene glycol monomethyl ether acetate or ethylene glycol diacetate.

10. The adhesive composition of claim 7, wherein the low temperature fusion aid is ethylene glycol monomethyl ether acetate or ethylene glycol diacetate present in an amount of about 2-5%.

11. The adhesive composition of claim 5, wherein the low temperature fusion aid is tetrahydrofurfuryl alcohol.

12. The adhesive composition of claim 6, wherein the low temperature fusion aid is tetrahydrofurfuryl alcohol.

13. The adhesive composition of claim 7, wherein the low temperature fusion aid is tetrahydrofurfuryl alcohol present in an amount of about 5-7%.

* * * * *